United States Patent Office 3,555,384
Patented Jan. 12, 1971

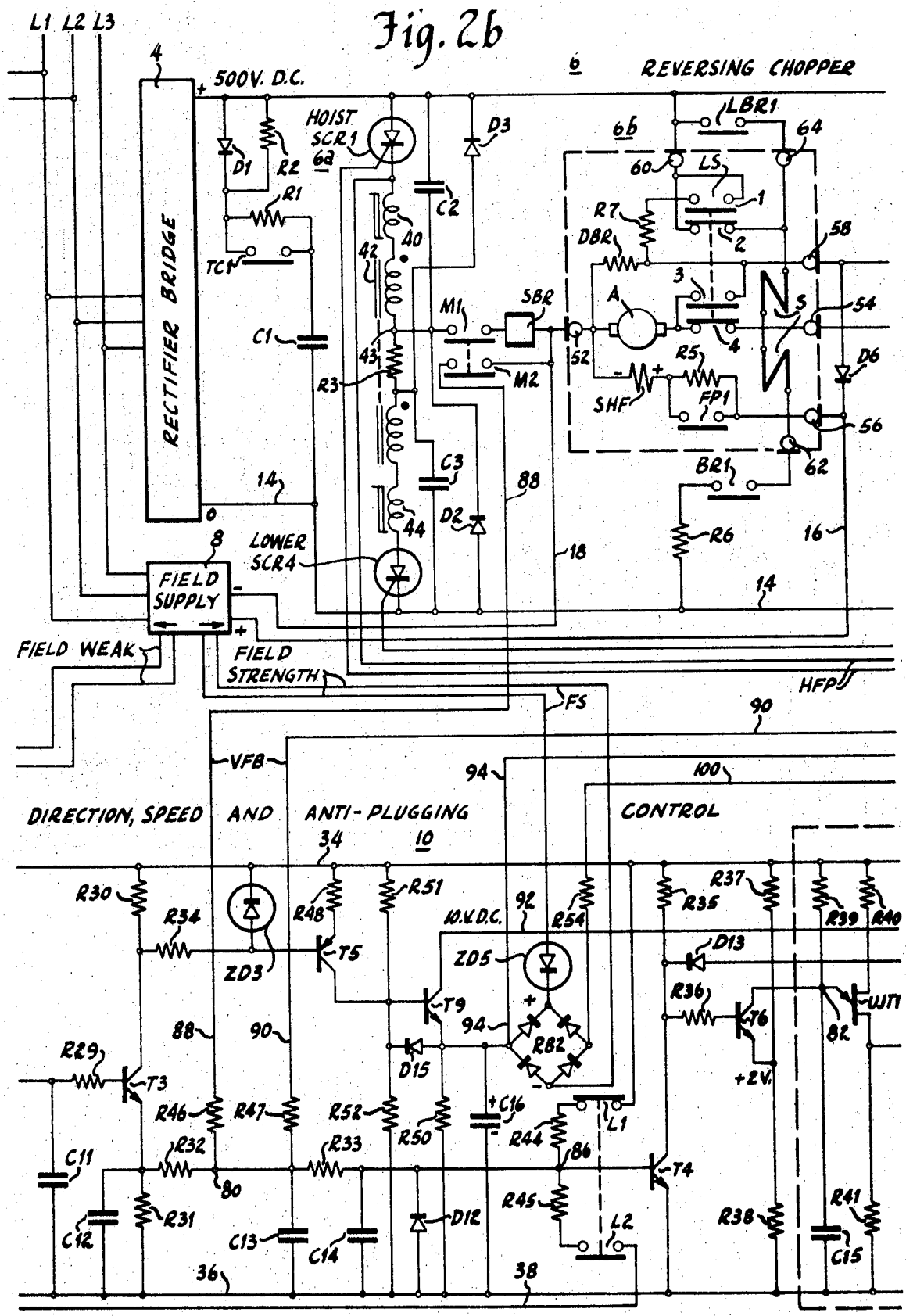

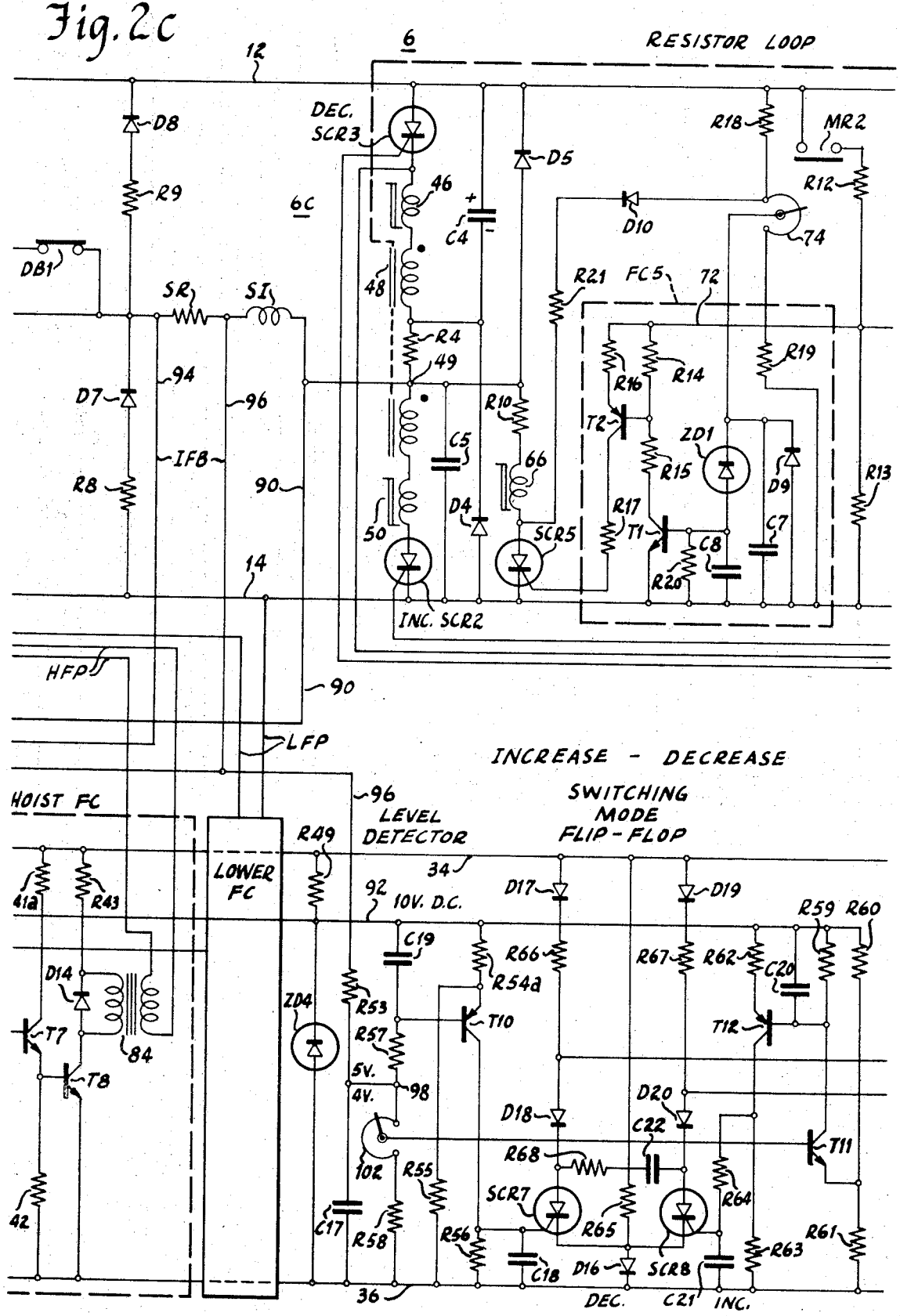

3,555,384
STATIC SHUNT MOTOR CRANE HOIST CONTROL SYSTEM WITH DOUBLE-DUTY RESISTORS
John A. Halvorson and Max S. Knasinski, West Allis, Robert L. Risberg, Milwaukee, and Richard P. Serbiak, Glendale, Wis., assignors to Cutler-Hammer, Inc., Milwaukee, Wis., a corporation of Delaware
Filed June 17, 1968, Ser. No. 737,610
Int. Cl. H02p 5/06
U.S. Cl. 318—257
10 Claims

ABSTRACT OF THE DISCLOSURE

A static control system for the shunt field motor of a crane hoist control having a static field supply and a solid state reversing chopper supplied from a constant potential bus for armature control with a first SCR controlled resistor loop for 75 percent second quadrant retarding torque and a second SCR controlled resistor loop usable with the first one for 150 percent fourth quadrant retarding torque. Bootstrap circuits minimize the firing circuit power supply requirements for the resistor loops. Solid state anti-plugging control is incorporated in the direction and speed control circuit. Limit stop backout at reduced torque and speed is provided from the constant potential bus. A unidirectional diode circuit affords automatic field energization from the armature in the event of power failure. Commutating inductor energy decaying resistors are relocated in the chopper circuit to protect the chopper and directional SCR's from induced voltages during commutation and to protect the bus from a short circuit if both SCR's fail as added functions. Field weakening and field strengthening controls are incorporated in the direction and speed control circuit.

BACKGROUND OF THE INVENTION

Both series motors and shunt motors have heretofore been used for hoist control.

With series motors fed from a constant potential bus, it has been necessary to commutate series resistance or the like for acceleration purposes to limit the inrush current to a safe value such as 150 percent of full load current, for example. In such system, each time the current decreases to full load value another step of resistance is shunted out for further acceleration. This has the disadvantage that acceleration torque is applied in a number of steps. Also, energy is consumed in the commutating resistors.

However, the series motor has certain advantages for hoist control. The drooping speed-torque characteristic provides high torque for rapid acceleration in hoisting and light loads are hoisted quickly without field control while heavy loads are hoisted more slowly. The series motor produces more torque under extreme conditions of increased load than a constant field shunt motor.

With shunt motors heretofore used for hoist control, Ward-Leonard systems were required to provide adjustable voltage control for the motor armature for torque and speed control. The motor-generator sets of these systems have the obvious disadvantage of high initial cost. Although no commutating resistors with their attendant energy-consuming disadvantages as in series motor controls were required, the A.C. motor required to drive the D.C. generator is a big drain on the power supply. Although the shunt motor with Ward-Leonard control does have these economic disadvantages, performance-wise it has been very good for hoist control. A big disadvantage of the Ward-Leonard system is that three machines must be mounted and maintained and add weight to the crane.

A static control involves only one machine and little weight.

It can be seen, therefore, that it would be desirable to devise a system that would provide performance equivalent to a Ward-Leonard shunt motor control and could be supplied from a constant potential bus like the series motor. Such a system would incorporate the best features of both types of prior systems, the performance of the adjustable voltage shunt motor and the constant potential supply. If the power source is alternating current, a rectifier is required to provide the constant potential for a series motor so that the system contemplated would require no more.

SUMMARY OF THE INVENTION

This invention relates to a static, constant potential bus, shunt motor control system.

While not limited thereto, the invention is especially applicable to crane hoist control wherein an overhauling load is encountered.

An object of the invention is to provide an improved static, constant potential bus, shunt motor control system.

A more specific object of the invention is to provide a static chopper circuit with means serving the dual function of protecting the switching devices from excessive supply voltage and decaying the commutating energy after it has performed its function.

Another specific object of the invention is to reconnect the resistors which serve to decay the commutating energy in a chopper circuit so that they continue to perform this function and are also in series with the switching devices across the line for protective purposes.

Another specific object of the invention is to reconnect the resistors which serve to decay the commutating energy in a solid state reversing chopper circuit to perform the additional function of being in series with the respectively associated solid state swtiching devices across the constant potental bus to protect such devices from excessive voltages.

Other objects and advantages of the invention will hereinafter appear.

BRIEF DESCRIPTION OF THE DRAWINGS

FIGS. 2a to 2d show a circuit diagram of the system of FIG. 1 constructed in accordance with the invention;

DESCRIPTION OF THE PREFERRED EMBODIMENT

Figure 1:
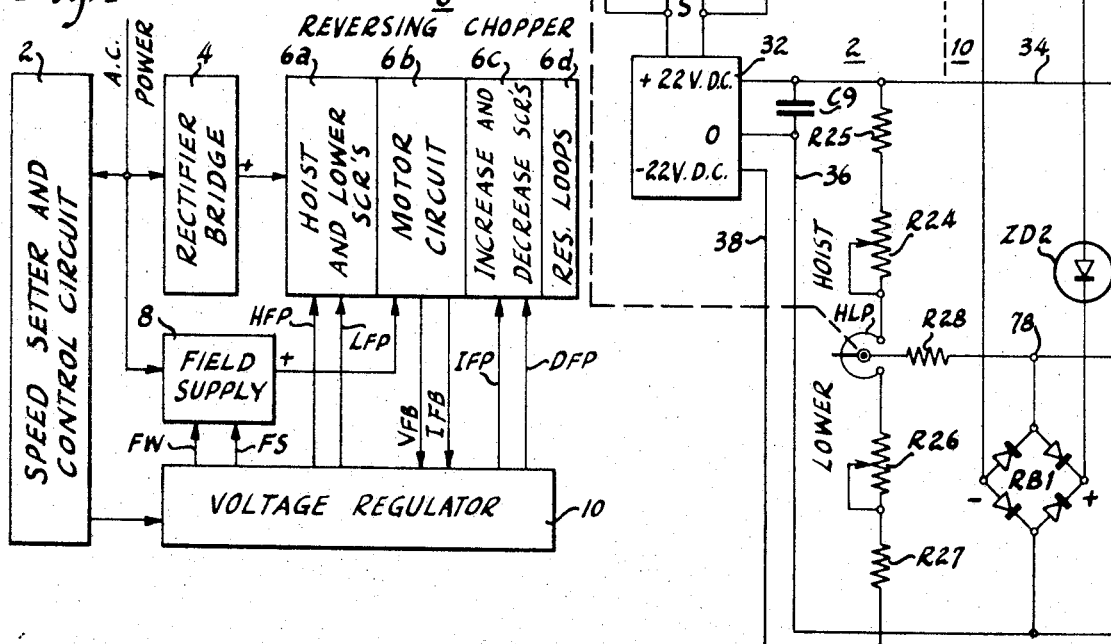
FIG. 1 is a block diagram of a static adjustable voltage hoist control system showing the general arrangement thereof.

Referring to FIG. 1, there is shown the general arrangement in block diagram of the hoist control system. As shown therein, the system comprises a speed setter and control circuit 2 supplied from an A.C. power source. The speed setter includes operator controlled means for operating the system in either the hoist or lower direction at the selected speed. The control circuit combined in block 2 with the speed setter includes the power contactors and control relays which are needed to make the system function.

The system as shown in the block diagram also comprises a rectifier bridge 4 supplied from the A.C. power source for providing direct current power to a reversing chopper circuit 6. This reversing circuit includes a circuit 6a having the hoist and lower semiconductor controlled rectifiers (SCR's), a motor circuit 6b including the armature and shunt field windings, a circuit 6c having the increase and decrease SCR's and a circuit 6d having two energy absorbing resistor loops and the SCR switching circuits therefor to control second and fourth quadrant torque.

This system shown in block diagram further comprises a field supply circuit 8 energized from the A.C. power source for supplying variable excitation to the motor shunt field winding, and a voltage regulating circuit 10 supplied with A.C. power from the control circuit and having a plurality of control connections between it and the field supply circuit and between it and the reversing chopper circuit. As will be appreciated, the reversing chopper circuit supplies D.C. current to the motor armature, of one polarity for hoisting operation and of the opposite polarity for lowering operation.

These control connections comprise a field weakening connection FW and a field strengthening connection FS from the voltage regulating circuit to the field supply circuit for applying signals that respectively weaken or strengthen the field excitation. These control connections also comprise a "hoist" firing pulse connection HFP and a "lower" firing pulse connection LFP from the voltage regulating circuit to the hoist and lower SCR's circuits for applying gating signals to the respectively corresponding SCR's. These control connections also comprise a voltage feedback connection VFB and a current feedback connection IFB from the motor circuit to the voltage regulating circuit for applying respectively corresponding feedback signals for regulation purposes. These control connections further comprise an "increase" firing pulse connection IFP and a "decrease" firing pulse connection DFP from the voltage regulating circuit to the increase and decrease SCR's circuits for applying gating signals to the respectively corresponding SCR's therein. These control functions will hereinafter be more fully described in connection with the circuit diagram.

The component circuits of the system shown in block form in FIG. 1 are shown in detail in the circuit diagram of FIGS. 2a to 2d.

Figure 2A:
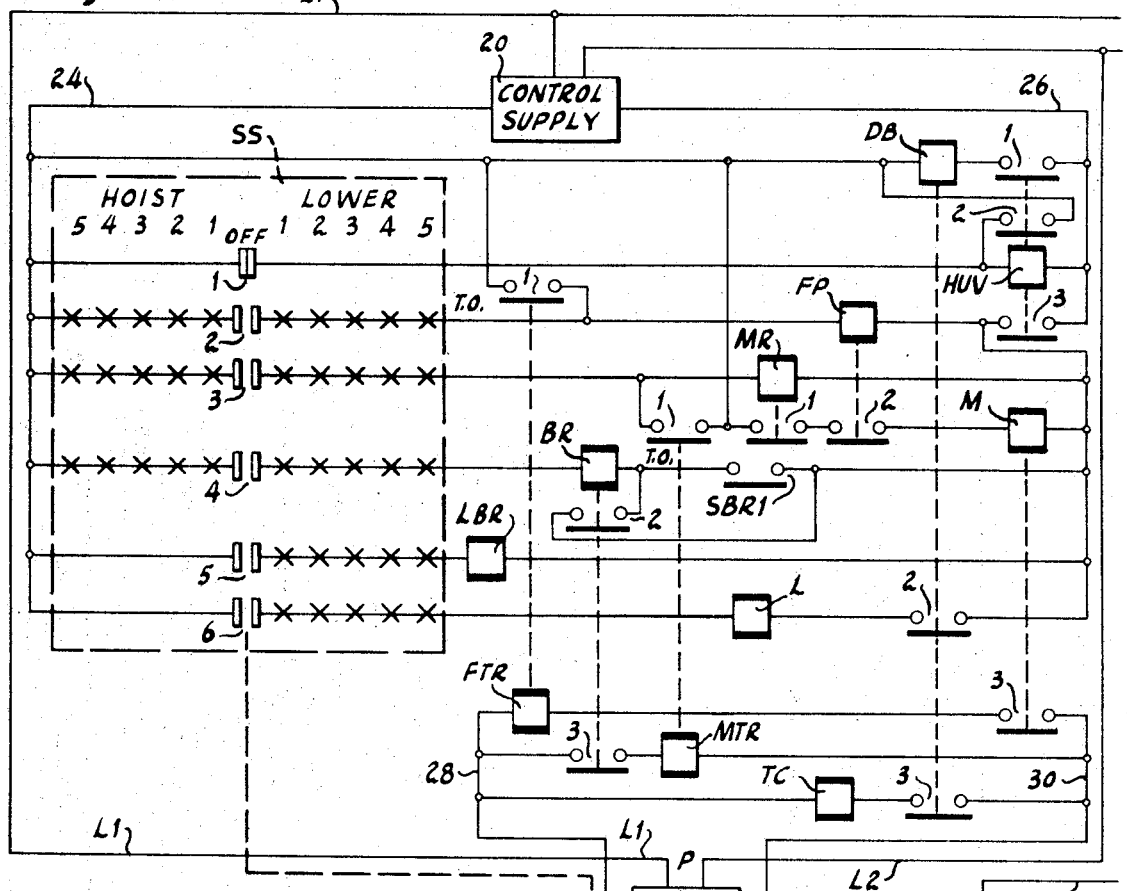

In this circuit diagram, the speed setter and control circuit are shown in FIG. 2a, the speed setter parts being shown at the upper left-hand and lower right-hand portions and the control circuit being shown at the upper right-hand portion thereof. The power rectifier bridge supplying the reversing chopper is shown at the upper left-hand portion of FIG. 2b. The reversing chopper circuit is shown at the upper portion of FIG. 2b and the upper left-hand portion fo FIG. 2c. The resistor loops are shown at the upper right-hand portion of FIG. 2c and the upper portion of FIG. 2d.

Also, in this circuit diagram, the field supply circuit is shown at the left midportion of FIG. 2b. And the voltage regulating circuit is shown at the lower right-hand portion of FIG. 2a and lower portions of FIGS. 2b, 2c and 2d.

This system is supplied with three-phase A.C. power from an external source to supply lines L1, L2 and L3 at the upper left-hand portion of FIG. 2b and is reduced and rectified as required to operate the various parts of the system. These supply lines connect this three-phase power to rectifier bridge 4 which affords an output of 500 volts D.C. or the like across supply conductors 12 and 14. These supply lines also connect this three-phase power to field supply circuit 8 which affords a D.C. output through conductors 16 and 18 to shunt field winding SHF of the motor.

Field supply circuit 8 is preferably a magnetic amplifier or the like which supplies controllable rectified current to the shunt field winding. This magnetic amplifier is provided with a pair of control windings energized from the voltage regulating circuit for field weakening and field strengthening purposes, respectively, as hereinafter more fully described.

In addition, two of the aforesaid supply lines, lines L1 and L2, connect single-phase power in FIG. 2a to a control supply circuit 20 and to the primary winding P of a step-down transformer 22. This control supply circuit may include a stepdown transformer and a rectifier bridge whereby to afford reduced voltage D.C. across supply conductors 24 and 26 of the speed setter and control circuit. Secondary winding S of transformer 22 supplies reduced voltage A.C. through supply conductors 28 and 30 to the timing relays of the control circuit. This secondary winding also supplies reduced voltage A.C. to a dual polarity power supply circuit 32. This circuit provides positive 22 volts D.C. across supply conductors 34 and 36 and provides negative 22 volts D.C. across supply conductors 38 and 36 for both the speed setter and the voltage regulating circuit.

A smoothing capacitor circuit is connected across the output of rectifier bridge 4 in FIG. 2b. This circuit comprises a connection from positive supply conductor 12 through a unidirectional diode D1, a resistor R1 and a capacitor C1 to zero voltage or common conductor 14. A capacitor discharge resistor R2 is connected across diode D1. A normally open relay contact TC1 is connected across resistor R1 and when closed completes a trap circuit for clipping overshoot voltages due to line inductance.

The reversing chopper circuit comprises primarily four semiconductor controlled rectifiers, a hoist SCR1, an increase SCR2, a decrease SCR3, and a lower SCR4. The hoist and lower SCR's are connected in a first half-bridge circuit across D.C. supply conductors 12 and 14. The decrease and increase SCR's are connected in a second half-bridge circuit across these supply conductors. The first half-bridge circuit comprises a connection from positive supply conductor 12 through hoist SCR1, a protective inductor 40, the upper half of a commutating inductor 42, junction 43, a double-duty resistor R3, the lower half of the commutating inductor, a protective inductor 44 and lower SCR4 to common conductor 14. The second half-bridge circuit comprises a connection from positive supply conductor 12 through decrease SCR3, a protective inductor 46, the upper half of a commutating inductor 48, a double-duty resistor R4, junction 49, the lower half of the commutating inductor, a protective inductor 50, and increase SCR2 to common conductor 14.

Each of the chopper SCR's is provided with a commutating capacitor. For this purpose, a capacitor C2 is connected across hoist SCR1, inductor 40 and the upper half of inductor 42. A capacitor C3 is connected across the lower half of inductor 42, inductor 44 and lower SCR4. A capacitor C4 is connected across decrease SCR3, inductor 46 and the upper half of inductor 48. A capacitor C5 is connected across the lower half of inductor 48, inductor 50 and increase SCR2.

The reversing chopper is also provided with means rendering it bilateral, that is, capable of conducting current also in the reverse direction with respect to each SCR thereof. For this purpose, a unidirectional diode D2 is connected from common conductor 14 to junction 43 and a unidirectional diode D3 is connected from the junction between resistor R3 and the lower half of inductor 42 to positive conductor 12. Also, a unidirectional diode D4 is connected from common conductor 14 to the junction between resistor R4 and the upper half of inductor 48 and a unidirectional diode D5 is connected from junction 49 to positive conductor 12.

The motor circuit comprises a connection from junction 43 in the hoist-lower half-bridge through a normally open contact M1, the coil of armature current detecting relay SBR, trolley connector 52, armature A, limit stop contact 4, trolley connector 54, series resistor SR and series inductor SI to junction 49 in the increase-decrease half-bridge. The shunt field circuit extends from positive conductor 16 of the field supply through trolley connector 56, field resistor R5 and normally open contact FP1 in parallel, field winding SHF, and trolley connector 52 to the other conductor 18 of the field supply.

A dynamic braking circuit extends from the left side of the armature through dynamic braking resistor DBR, trolley connector 58, normally closed contact DB1, trolley connector 54 and normally closed contact 4 of the limit stop switch to the right side of the armature.

A field supply circuit effective in the event of power failure extends from the right side of the armature through contact 4 of limit stop switch LS, trolley connector 54, contact DB1, a unidirectional diode D6, trolley connector 56, resistor R5 and the shunt field winding to the left side of the armature. In this circuit, the rotating armature will maintain the field energized.

A brake release solenoid circuit extends from positive supply conductor 12 through a trolley connector 60, normally closed limit stop contact 2, two solenoids S in series, trolley connector 62, normally open brake release relay contact BR1 and resistor R6 to common conductor 14.

For limit stopping purposes, the motor is provided with a dynamic braking circuit extending from the left side of the armature through resistor DBR and normally open contact 3 of the limit stop switch to the right side of the armature. To permit backout of the hoist from limit stop, a lowering circuit extends from the positive supply conductor through trolley connector 60, normally open contact 1 of the limit stop switch, resistor R7, then in one path through resistor DBR and in a parallel path through limit stop contact 3 and armature A, then through trolley connector 52, relay SBR coil, contact M1, junction 43, resistor R3, the lower half of inductor 42, inductor 44 and lower SCR4 to common conductor 14. To permit release of the mechanical brake during backout when limit stop contact 2 is open, normally open contact LBR1 of lowering brake release relay LBR is connected through a trolley connector 64 to form a bypass circuit to the brake release solenoids in shunt of limit stop contact 2 and trolley connector 60.

As shown in FIG. 2b, the motor and associated elements enclosed within the broken lines are mounted on the trolley and are connected by connectors 52–64 to the external circuit.

For inductor SI discharge purposes upon opening of contact M1, a small resistor R8 and a unidirectional diode D7 are connected in series from common conductor 14 to the junction between series resistor SR and trolley connector 54 and a like resistor R9 and a unidirectional diode D8 are connected in series from the latter junction to the positive supply conductor.

Figure 2D:
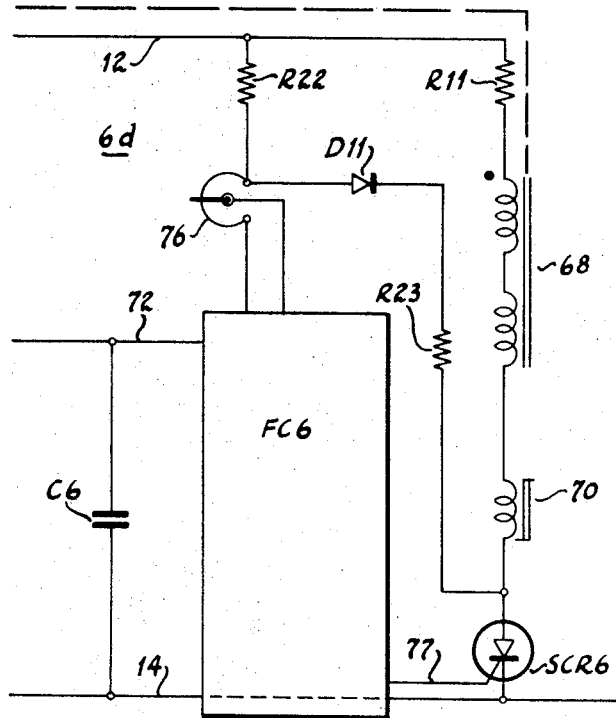
Figure 2D:
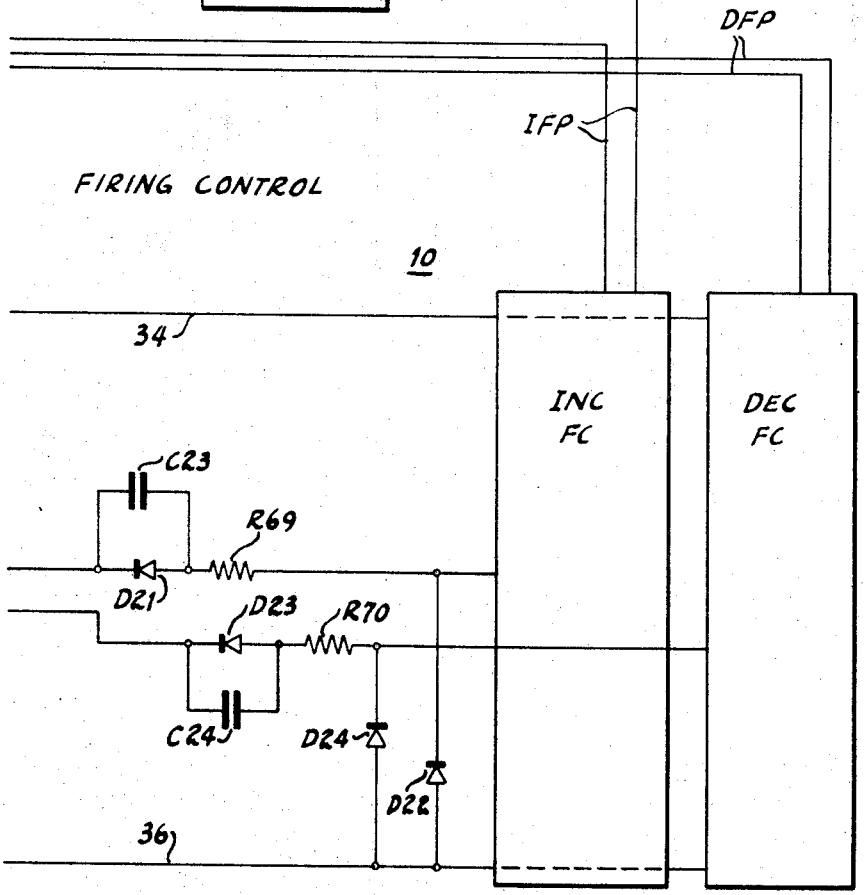

The chopper is provided with two SCR-controlled resistor loops for energy absorbing regenerative braking shown in FIGS. 2c and 2d for providing 75 percent retarding torque to decelerate on hoisting (Quadrant II operation) and for providing 150 percent retarding torque to decelerate on lowering (Quadrant IV operation). The first resistor loop extends from junction 49 in the increase-decrease half-bridge through a braking resistor R10, a protective inductor 66 and a semiconductor controlled rectifier SCR5 to common conductor 14. The second resistor loop extends from positive supply conductor 12 through a braking resistor R11, a commutating inductor 68 magnetically coupled to inductor 48 as indicated by the broken line, protective inductor 70 and a semiconductor controlled rectifier SCR6 to common conductor 14.

These resistor loops SCR's are provided with individually adjustable firing circuits so that they can be made to fire at different values of bus voltage, that is, voltage across supply conductors 12 and 14. For this purpose, a voltage divider comprising resistors R12 and R13 in series is connected by a normally open contact MR2 across supply conductors 12 and 14. A smoothing capacitor C6 is connected across resistor R13. Supply voltage is provided from the junction between these resistors to the transistors of firing circuit FC5 and to the transistors of a like firing circuit FC6, the latter being shown in block form to avoid unnecessary duplication of circuit details. This junction is connected through resistors R14 and R15 and the collector and emitter of an NPN transistor T1 to common conductor 14. This junction is also connected through a resistor R16, the emitter and collector of a PNP transistor T2 and a resistor R17 to the gate of SCR5. This junction is similarly connected through conductor 72 to firing circuit FC6.

A voltage level responsive detector circuit is provided for circuit FC5 to respond to the bus voltage when it reaches a predetermined value. For this purpose, positive supply conductor 12 is connected through a voltage divider including a resistor R18, the resistor of a potentiometer 74 and a resistor R19 to common conductor 14. The slider of potentiometer 74 is connected through a Zener diode ZD1 to the base of transistor T1 to turn this transistor on when the bus voltage reaches a value determined by the setting of potentiometer 74. A noise suppression capacitor C7 is connected across Zener diode ZD1 and the base-emitter circuit of transistor T1. A unidirectional diode D9 is connected across capacitor C7 and poled to prevent any reverse charge on capacitor C7. A noise suppression capacitor C8 is connected across the base-emitter circuit of transistor T1. A resistor R20 is connected across capacitor C8 to leak the charge off the latter. A bootstrap circuit extends from the positive side of potentiometer 74 through a unidirectional diode D10 and a resistor R21 to the anode of SCR5 to lower the voltage on the detector circuit as soon as SCR5 fires. This prevents unnecessary loading of the components in the detector circuit after the associated SCR5 has fired. Diode D10 blocks induced voltages from causing breakover of Zener diode ZD1.

Firing circuit FC6 is provided with similar voltage responsive and bootstrap circuits. For this purpose, positive supply conductor 12 is connected through a resistor R22 and the resistor of a potentiometer 76 to firing circuit FC6. The slider of this potentiometer is also connected to firing circuit FC6 and the latter is connected through a conductor 77 to the gate of SCR6. A bootstrap connection extends from the positive side of potentiometer 76 through a unidirectional diode D11 and a resistor R23 to the anode of SCR6 for purposes hereinbefore described. Firing circuit FC6 is similar to firing circuit FC5, the difference being that the slider of potentiometer is set to a higher positive voltage than the slider of potentiometer 74 so that SCR5 is fired at a first value of voltage above bus voltage and SCR6 is fired at a higher value of voltage above bus voltage.

Speed setter SS shown in FIG. 2a comprises a hoistlower switch having contacts 1 to 6, and a hoist-lower potentiometer HLP mechanically connected thereto as indicated by the broken line. Contact 1 is normally closed in the center off position and contacts 2 to 6 are open. Contact 1 opens and contacts 2, 3 and 4 close when the speed setter is turned in the hoist direction. Contact 1 opens and contacts 2 to 6 close when the speed setter is turned in the lower direction.

As will be apparent, these contacts control the contactors and relays of the control circuit. One side of speed setter potentiometer HLP is connected through an adjustable resistor R24 and a fixed resistor R25 to positive 22 volt supply conductor 34. The other side of the speed setter potentiometer is connected through an adjustable resistor R26 and a fixed resistor R27 to negative 22 volt supply conductor 38. A smoothing capacitor C9 is connected from positive conductor 34 to zero voltage conductor 36. The slider of the speed setter potentiometer is connected through a resistor R28 to input terminal 78 of the voltage regulator circuit. Positive to zero voltage supply conductors 34 and 36 and negative voltage conductor 38 are also connected to the voltage regulator circuit.

The control circuit in FIG. 2a comprises a hoist under-voltage relay HUV, a dynamic braking contactor DB, a reduced field control relay FP, a main contactor M, a main control relay MR, a friction brake control relay BR, a "lower" brake control relay LBR, and a lower control relay L. All of these relays and contactors are controlled by the contacts of the speed setter switch across D.C. supply conductors 24 and 26. In addition, the control circuit comprises a field timing relay FTR, a main timing relay MTR, and a timed charging control relay TC. These latter relays are controlled by some of the first mentioned relays across A.C. supply conductors 28 and 30.

Regulating circuit 10 comprises primarily two parts. One of these parts is a solid state direction, speed and anti-plugging control circuit that extends from the lower right-hand portion of FIG. 2a through the lower portion of FIG. 2b to the lower portion of FIG. 2c. The other part is an increase-decrease SCR firing control circuit that extends from the lower portion of FIG. 2c to the lower portion of FIG. 2d.

The direction, speed and anti-plugging control circuit, as its name indicates, controls the direction of motor rotation and its speed. This circuit also controls anti-plugging; that is, when the motor is rotating in one direction, it prevents application of a voltage in the other direction until the motor has decelerated to substantially zero speed. Braking means other than plugging are used thereby saving the switched protective resistors or the like in the power circuit which plugging would require. To control the direction, this circuit controls hoist SCR1 and lower SCR4. To control the speed, this circuit provides a selectively adjustable current reference signal, that is, a voltage proportional to current reference. For anti-plugging control, this circuit uses the polarity of the motor counter voltage to prevent firing of the other directional SCR until the motor has been decelerated to approximately 5 percent speed or the like.

The increase-decrease firing control circuit, as its name signifies, controls alternate firing of increase SCR2 and decrease SCR3. This circuit comprises a level detector which detects the algebraic sum of the current reference signal and the motor current feedback signal and controls a switching mode flip-flop circuit which in turn controls an increase firing circuit and a decrease firing circuit alternately when such algebraic sum varies above 5 volts and below 4 volts, respectively.

As shown in FIGS. 2a–c, the direction, speed and anti-plugging control circuit is supplied with operating voltage from plus 22 volt conductor 34 to zero voltage conductor 36. Negative voltage conductor 38 of minus 22 volts is connected thereto for lowering control as hereinafter described.

The speed control portion of the circuit is provided with means affording field weakening control in the range above base speed. This means comprises a rectifier bridge RB1 having its input terminals connected between speed reference signal input terminal 78 and zero voltage conductor 36. The positive and negative output terminals of this bridge are connected through conductors FW to field supply circuit 8, there being a Zener diode ZD2 in the positive output terminal connection. These field weakening conductors FW are connected across a control winding in the field supply magnetic amplifier. The Zener diode functions as a spillover device to limit energization of such control winding to the range of speed reference voltage above base speed.

Speed reference signal input terminal 78 is connected through a resistor R29 to the base of an NPN transistor T3. The collector of this transistor is connected through a resistor R30 to positive supply conductor 34 and the emitter thereof is connected through a resistor R31 to zero voltage or common conductor 36. A time reference capacitor C11 is connected from input terminal 78 to common conductor 36 and forms with resistor R28 an RC time constant for the speed reference signal. A noise suppression capacitor C12 is connected across emitter resistor R31.

Transistor T3 is an amplifier which provides a current reference signal applied from the collector of transistor T3 through a resistor R34 to the base of an amplifier PNP transistor T5. The emitter of transistor T3 is connected through a resistor R32, a junction 80 and a resistor R33 to the base of a directional control NPN transistor T4. A filter capacitor C13 is connected from junction 80 to conductor 36.

Transistor T4 controls hoist firing circuit (HOIST FC) and lower firing circuit (LOWER FC). The collector thereof is connected through a resistor R35 to positive supply conductor 34 and the emitter is connected directly to common conductor 36. In the base circuit of this transistor, noise suppression capacitor C14 is connected from the junction between the base and resistor R33 to common conductor 36. A unidirectional diode D12 is connected from the emitter to the base of transistor T4 to protect it from reverse voltage.

Directional control transistor T4 provides two output signals from its collector. One of these outputs is a decreasing-toward-zero voltage signal for hoisting control and the other output is an increasing positive voltage signal for lowering control as shown in FIG. 5b. For the positive voltage signal (plus), the collector of transistor T4 is connected through a resistor R36 to the base of a switching mode NPN transistor T6. A voltage divider having resistors R37 and R38 in series across the supply conductors has its plus 2 volt midpoint connected to the emitter of transistor T6. The collector of this transistor is connected to the oscillator input in the hoist firing circuit. A like point in the oscillator of the lower firing circuit is connected through a unidirectional diode D13 to the collector of transistor T4 for the decreasing-toward-zero voltage signal.

The hoist firing circuit comprises a relaxation oscillator and an amplifier for producing firing pulses and applying them through hoist firing pulse conductors HFP across the gate and cathode of hoist SCR1.

In the oscillator, a resistor R39 and a capacitor C15 are connected in series from positive conductor 34 to common conductor 36 with input junction 82 therebetween connected to the emitter of unijunction transistor UJT1. Interbase voltage is applied to the unijunction transistor from positive conductor 34 through resistor R40 to base B2 while base B1 is connected through resistor R41 to common conductor 36. Capacitor C15 charges through resistor R39 and discharges through the emitter-base B1 circuit of the unijunction transistor repeatedly to send pulses of current into the base of amplifier transistor T7. For this purpose, base B1 is connected to the base of NPN transistor T7 and the collector and emitter of the latter are connected through resistors R41a and R42 to supply conductors 34 and 36, respectively. The emitter of transistor T7 is connected to the base of NPN transistor T8. The emitter of the latter is connected to common conductor 36 while the collector thereof is connected through the primary winding of an output transformer 84 and a resistor R43 to positive supply conductor 34. The oscillator pulses are amplified in the amplifier including transistors T7 and T8 and are then applied from the transformer secondary winding to the gate of hoist SCR1. A freewheeling diode D14 is connected across the primary winding of transformer 84.

Whenever transistor T6 is rendered conducting, it shunts capacitor C15 through resistor R38 to common conductor 36 to stop the oscillator. Resistors R37 and R38 are given values to set the emitter voltage of transistor T6 at plus 2 volts to determine to what value the collector voltage of transistor T4 must go to start or stop hoist oscillator and to determine the dead band between hoist and lower. Whenever, transistor T6 is rendered nonconducting, the oscillator runs. Transistor T6 actually is an inverter of the signal for the hoist firing circuit since both the hoist and lower firing circuits are controlled from the collector of transistor T4 so that only one oscillator can operate at a time. Thus, when directional control transistor T4 is on, it shunts the oscillator of the lower firing circuit through diode D13 and itself to common conductor 36 to prevent sending of lower firing pulses. At the same time, the near zero voltage at the collector of transistor T4 and the plus 2 volts at the emitter of transistor T6 biases transistor T6 off so that the oscillator in the hoist firing circuit can run. On the other hand, when transistor T4 is turned off, the oscillator in the lower firing circuit runs. Diode D13 blocks any current flow from conductor 34 through resistor R35 into the oscillator of the lower firing circuit. Firing pulses are applied from the lower circuit through conductors LFP across the gate and cathode of lower SCR4. At the same time, current flows from supply conductor 34 through resistors R35 and R36 into the base of transistor T6 to turn it on thereby to shunt and stop the oscillator in the hoist firing circuit.

For controlling transistor T4, its base is connected to a current summing junction 86. Positive current is normally connected to this summing junction through closed contact L1 and a resistor R44 for hoisting control. Negative current may be connected to this summing junction from conductor 38 through open contact L2, when closed, and a resistor R45 for lowering control. A current proportional to motor counter voltage is connected to this summing junction from junction 80 through resistor R33. This counter voltage is applied to junction 80 through a voltage feedback circuit VFB. This voltage feedback circuit comprises a connection from the left side of the armature through trolley connector 52, normally open contact M2, conductor 88 and a resistor R46 to junction 80 and a connection from junction 80 through a resistor R47, conductor 90, series inductor S1, series resistor SR, trolley connector 54 and contact 4 to the right side of the armature. This counter voltage applied to summing junction 86 is positive polarity on hoisting and negative polarity on lowering.

It will be recalled that for speed control a current reference signal was connected from the collector of transistor T3 through resistor R34 to the base of transistor T5. Positive voltage is applied through a resistor R48 to the emitter of transistor T5 and the collector thereof is connected to the base of an emitter follower NPN transistor T9. Positive voltage is applied from 22 volt conductor 34 through a resistor R49 in FIG. 2c to 10 volt supply conductor 92 and therefrom to the collector of transistor T9 in FIG. 2b and the emitter thereof is connected through a resistor R50 to common conductor 36. A noise suppressing capacitor C16 is connected across resistor R50. A voltage divider having resistors R51 and R52 in series connection across positive to zero voltage supply conductors 34 and 36 has its midpoint connected to the base of transistor T9 to bias the latter on a small amount to limit the negative torque to 75 percent by limiting the reduction in the current reference signal. A unidirectional diode D15 is connected from the emitter to the base of transistor T9 to limit the reverse voltage thereacross. A Zener diode ZD3 is connected from positive conductor 34 to the base of transistor T5 to limit the magnitude of the current reference that can be applied to the transistor to limit the positive torque to 150 percent.

A ten volt D.C. voltage is applied from supply conductor 92 as a supply voltage for the gating control transistors in the flip-flop circuit in FIG. 2c. A Zener diode ZD4 is connected from conductor 92 to conductor 36 for regulating this voltage to 10 volts Positive 22 volts is applied from conductors 34 and 36 to the flip-flop SCR's and increase and decrease firing circuits in FIGS. 2c and 2d.

A motor current feedback signal is algebraically added to the current reference signal and the sum thereof is applied to the level detector. For this purpose, the current reference signal at the emitter of transistor T9 is connected through a conductor 94, series resistor SR, conductor 96 and resistor R53 to voltage level detector junction 98. A capacitor C17 is connected from junction 98 to common conductor 36 for noise suppression. This level detector controls increase firing circuit INC FC and decrease firing circuit DEC FC by way of the switching mode flip-flop circuit. When the sum voltage at junction 98 is 5 volts or above, increase SCR2 will be fired. And when this sum voltage is 4 volts or below, decrease SCR3 will be fired. These increase and decrease SCR's will be fired alternately to provide a sawtooth motor current wave whose average value controls the torque of the motor.

The aforementioned current feedback circuit also controls a field strengthening circuit to become effective whenever the motor current exceeds a predetermined value for regulation purposes. This circuit comprises a rectifier bridge RB2 having one input terminal connected through conductor 94 to the left end of series resistor SR and having its other input terminal connected through a resistor R54 and conductors 100 and 96 to the right end of series resistor SR. The positive and negative output terminals of this rectifier bridge are connected through conductors FS across the field strengthening control winding in the field supply magnetic amplifier, there being a Zener diode ZD5 in the positive output terminal connection as a spillover device which passes current on motor exceeding a predetermined value as determined by the voltage drop on series resistor SR.

The level detector in FIG. 2c comprises a voltage divider having resistors R54a and R55 connected from positive 10 volt conductor 92 to common conductor 36 with their midpoint connected to the emitter of a PNP transistor T10 to set this emitter at a predetermined voltage. The collector of this transistor is connected directly to the gate of SCR7 in the switching mode flip-flop circuit and is also connected through a resistor R56 to common conductor 36. A noise suppression capacitor C18 is connected from the gate of SCR7 to common conductor 36. The base of transistor T10 is connected through a resistor R57, junction 98, the resistor of potentiometer 102 and a resistor R58 to common conductor 36. A noise suppression capacitor C19 is connected from positive conductor 92 to the base of transistor T10.

This level detector has in effect two outputs, one to the base of transistor T10 and the other from the slider of potentiometer 102 to the base of NPN transistor T11. The voltage divider comprising resistors R54a and R55 sets the voltage at the emitter of transistor T10 so that this transistor will conduct whenever the voltage at junction 98 is 4 volts or lower. The slider of potentiometer 102 is set so that transistor T11 will conduct whenever the voltage at junction 98 is 5 volts or higher. As will be apparent, transistor T10 fires SCR7 directly and transistor T11 controls the firing of SCR8.

For the above purpose, supply voltage is applied from conductor 92 through a resistor R59 to the collector of transistor T11. The emitter is connected to the midpoint of a voltage divider having resistors R60 and R61 connected from positive conductor 92 to common conductor 36. This voltage divider puts a bias voltage on the emitter to provide for the gap or dead band (between 4 volts and 5 volts) of the conduction ranges of transistors T10 and T11.

In the aforementioned circuit, the collector of transistor T11 is connected to the base of a PNP transistor T12. The emitter receives supply voltage from conductor 92 through a resistor R62 while the collector is connected through a resistor R63 to common conductor 36. A noise suppression capacitor C20 is connected between positive conductor 92 and the base of transistor T12. The collector is also connected through a resistor R64 to the gate of SCR8. This gate is connected through a noise suppression capacitor C21 to common conductor 36.

To counteract on the effect of any leakage currents in the gate circuits of the flip-flops SCR's, cathode bias voltage is provided for both of them from a voltage divider. This divider includes a resistor R65 connected from positive conductor 92 through a unidirectional diode D16 to common conductor 36 which the junction therebetween connected to the cathodes of both SCR's.

Supply voltage is applied to the flip-flop SCR's from 22 volt conductor 34 through a unidirectional diode D17, a resistor R66 and another unidirectional diode D18 to the anode of SCR7, and through a unidirectional diode D19, a resistor R67 and another unidirectional diode D20 to the anode of SCR8. A commutating circuit including a capacitor C22 and a resistor R68 in series connection is connected between the anodes of the SCR's.

Increase firing circuit INC FC and decrease firing circuit DEC FC each comprises a relaxation oscillator of the unijunction transistor type and a two transistor amplifier similar to hoist firing circuit HOIST FC hereinbefore described and the details thereof have not been shown to avoid unnecessary duplication. The increase and decrease firing circuits are provided with operating voltage across supply conductors 34 and 36. Increase firing pulses are applied from the increase firing circuit through conductors IFP to the gate and cathode gate of increase SCR2. Decrease firing pulses are applied from the decrease firing circuit through conductors DFP to the gate and cathode of decrease SCR3.

The increase and decrease firing circuits are each provided with an input shunting circuit to stop operation of the oscillator thereof. For this purpose, the input of the increase firing circuit is connected through a resistor R69 and a unidirectional diode D21 to the junction between resistor R66 and diode D18 in the anode circuit of SCR7. A one shot quick restarting capacitor C23 is connected across diode D21. A unidirectional diode D22 is connected from common conductor 36 to the input of the increase firing circuit to provide a discharge path for capacitor C23. The input of the decrease firing circuit is similarly connected through a resistor R70 and a unidirectional diode D23 to the junction between resistor R67 and diode D20 in the anode circuit of SCR8. A one shot quick restarting capacitor C24 is connected across diode D23. A discharge path for capacitor C24 extends from conductor 36 through unidirectional diode D24 to the input of DEC FC.

When the voltage at junction 98 of the level detector is more than 5 volts, increase SCR2 is fired into conduction. Under this condition, the voltage at the slider of potentiometer 102 is high enough to render transistor T11 conducting. As a result, the voltage across resistor R59 conducting renders transistor T12 to gate SCR8 into conduction. This causes the input of the decrease firing circuit to be shunted through resistor R70, diodes D23 and D20, SCR and diode D16 to common conductor 36. Any charge on capacitor C24 discharges in this circuit which extends further from common conductor 36 through diode D24 and resistor R70 to prepare this capacitor for a one shot passage of current to restart the decrease oscillator quickly next time SCR8 is turned off. Turning SCR8 on as aforesaid causes SCR7 to be turned off by the charge on capacitor C22. This capacitor is charged to plus on its right side and minus on its left side. Firing SCR8 lowers the voltage on the right side of capacitor C22 near zero voltage. Consequently, the left side of the capacitor goes to negative voltage to reverse bias SCR7 and turn it off. Capacitor C22 then discharges and charges in the opposite polarity with plus on its left side. Diode D18 traps this charge on capacitor C22.

With increase SCR2 on, the motor current feedback now increases to decrease the voltage at level detector junction 98 below 4 volts. The voltage at the slider of potentiometer 102 decreases sufficiently to turn transistor T11 off. Transistor T12 also turns off. However, SCR8 remains on once it has been fired. The decreased voltage at the level detector junction causes transistor T10 to be turned on to fire SCR7 into conduction. This causes the input of the increase firing circuit to be shunted. At the same time capacitor C22 turns SCR8 off. One shot of current now flows from conductor 34 through diode D19, resistor R67, capacitor C24 and resistor R70 to the decrease firing circuit. This current charges the capacitor (corresponding to capacitor C15 in the hoist firing circuit, FIG. 2b) quickly to start the decrease oscillator running. Capacitor C24 charges to stop this current flow after the first oscillator pulse and this charge is trapped on capacitor C24 by diode D19 whereafter the decrease oscillator runs at its normal frequency.

With SCR7 conducting, commutating capacitor C22 charges with plus on its right side. Diode D20 traps this charge on the commutating capacitor.

The increase and decrease firing circuits continue to operate alternately at a frequency of about 200 cycles per second. Each time increase is fired, the motor current increases to reduce the voltage at the level detector resulting in firing decrease. This decrease operation results in firing decrease. This decrease operation results in decrease in motor current to raise the voltage at the level detector resulting in firing increase again, etc., repeatedly.

A typical operation of the system will now be described with reference to the curves shown in FIGS. 3, 4 and 5.

When power is applied to the system, current flows from the positive output side of rectifier bridge 4 through diode D1 and resistor R1 to charge capacitor C1 in FIG. 2b. Full unidirectional voltage is applied from rectifier bridge 4 across supply conductors 12 and 14. Field supply circuit 8 energizes the shunt field winding of the motor. For this purpose, current flows from positive field supply output conductor 16 through resistor R5, field winding SHF to the other field supply conductor 18. Circuit 20 in FIG. 2a is energized from lines L1 and L2 and applies unidirectional voltage across conductors 24 and 26. Transformer 22 in FIG. 2a is energized from lines L1 and L2 applies reduced A.C. across conductors 28 and 30. Circuit 32 in FIG. 2a is energized from lines L1 and L2 and applies positive 22 volts to conductor 34, zero volts to conductor 36 and negative 22 volts to conductor 38.

With speed setter SS in its off position, hoist undervoltage relay HUV energizes through contact 1 of the speed setter across conductors 24 and 26. Relay HUV closes its contact 1 to energize the coil of dynamic braking contactor DB across conductors 24 and 26. Relay HUV closes its contact 2 to complete a self-maintaining circuit in shunt of contact 1 of the speed setter. Relay HUV also closes its contact 3 to connect supply voltage to additional control relays to enable operation thereof by the speed setter.

Contactor DB being energized as aforesaid opens its contact DB1 at the left portion of FIG. 2c to open the dynamic braking circuit of the motor. Contactor DB also closes its contact 2 in the circuit of limit relay L, and closes its contact 3 to energize the coil of timed closing relay TC across conductors 28 and 30. Relay TC closes its contact TC1 in FIG. 2b to shunt resistor R1 out of the circuit of capacitor C1.

For hoisting operation, speed setter SS is turned in the hoist direction to open its contact 1 and to close its contacts 2, 3 and 4. These contacts remain in these positions throughout the hoist portion of the speed setter. However, the speed setter potentiometer HLP at the lower portion of FIG. 2a is mechanically connected to the contact operating mechanism as indicated by the broken line and is advanced clockwise for each speed point.

Contact 2 of the speed setter energizes the coil of field protection relay FP through contact 3 of relay HUV. Contact 3 of the speed setter energizes the coil of main control relay MR and contact 4 thereof closes a point in the circuit of brake relay BR.

Field protection relay FP closes its contact FP1 in FIG. 2b to shunt resistor R5 of four ohms or the like out of the motor shunt field SHF circuit. This relay FP also closes its contact 2 to close a point in the circuit of main contactor M.

Relay MR closes its contact 1 to energize the coil of main contactor M. Relay MR also closes its contact MR2 in FIG. 2c to connect voltage divider resistors R4 and R5 across supply conductors 24 and 26 to provide supply voltage from the junction therebetween to the transistors of firing circuits FC5 and FC6. As a result, the main contactor closes its contact M1 in FIG. 2b to connect motor armature A to the reversing chopper circuit. The main contactor also closes its contact M2 in FIG. 2b to complete a motor armature voltage feedback circuit to junction 80 of the SCR firing circuit. Contactor M also closes its contact 3 to energize the coil of field timer relay FTR across conductors 28 and 30.

Field timer relay FTR closes its contact 1 without effect at this time. This is a timed opening contact as indicated by T.O. adjacent thereto and functions when the relay is deenergized to delay insertion of resistor R5 in the field circuit for a short time interval.

From the foregoing it will be apparent that the motor shunt field winding has been energized and the armature has been connected to the reversing chopper circuit. If the SCR's are now fired, the motor will start running.

This firing of the chopper SCR's is controlled by the voltage regulating circuit at the lower portions of FIGS. 2a to 2d. It will be recalled that turning of the speed setter in the hoist direction caused rotation of the slider of potentiometer HLP clockwise. Resistors R24 and R26 may be adjusted so that when the slider of the potentiometer is at the middle, its voltage is zero. Consequently, clockwise turning of the slider will cause a positive voltage to appear thereon with respect to zero voltage conductor 36. And counterclockwise turning of this slider will cause a negative voltage to appear thereon with respect to zero voltage conductor 36.

When the positive voltage is applied from the slider of potentiometer HLP to the base of transistor T3, it renders the latter conducting. Current flows from conductor 34 through resistor R30, the collector and emitter of the transistor and resistor R31 to conductor 36. The output from transistor T1 is taken from the collector thereof and applied through resistor R34 to the base of transistor T5 to render the latter conducting.

The amount of turn-on of transistor T5 is limited by Zener diode ZD3. Thus, if the input voltage to transistor T5 is larger than the breakover voltage of this Zener diode, the latter will conduct current to limit the turn-on level of transistor T5, thereby limiting the positive magnitude of the signal (indicative of current reference) that may be applied to transistor T9. In this manner, the positive torque of the motor is limited to 150 percent of full load torque.

The signal coming from the collector of transistor T5 turns emitter follower transistor T9 on proportionally. A voltage proportional to current reference is applid from the emitter of transistor T9 through conductor 94, resistor SR, conductor 96 and resistor R53 to level detector junction 98.

In the meantime, when power was applied across conductors 34 and 36, current flow from conductor 34 in FIG. 2b through limit relay contact L1 and resistor R44 into the base of transistor T4 turns the latter on. As a result, the input to the lower firing circuit is shunted through diode D13 and transistor T4 to zero voltage conductor 36. This prevents operation of the lower firing circuit. At the same time, the reduced voltage at the collector of transistor T4 turns transistor T6 off. As a result, the hoist firing circuit operates and sends pulses of current through conductors HFP to gate hoist SCR1 into conduction.

The aforesaid voltage applied to the level detector causes the voltage thereat to rise above 5 volts. This causes operation of the increase-decrease firing circuit to fire increase SCR2 and decrease SCR3 alternately as hereinbefore described to produce 150 percent hoisting torque as shown at the left portion of curve T in FIG. 3. Current flow in the armature circuit energizes relay SBR which closes its contact SBR1 in FIG. 2a to energize brake release relay BR. This relay closes its contact BR1 in FIG. 2b to energize solenoids S in a circuit extending through normally closed limit stop contact 2 and resistor R6. Solenoids S disengage the mechanical brake to allow the motor to start rotating. Relay BR also closes its contact 2 in FIG. 2a to maintain itself across contact SBR1 and closes its contact 3 to energize main timing relay MTR across supply conductors 28 and 30. Relay MTR closes its contact 1 to complete a timed opening maintaining circuit for relay MR in shunt of speed setter contact 3.

Figure 3:
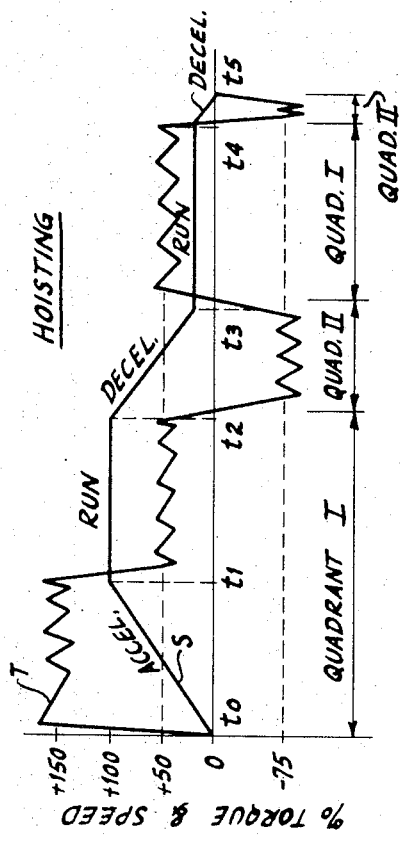
FIGS. 3 and 4 graphically depict hoisting and lowering functional characteristics, respectively, of the system of FIG. 2.

This positive torque accelerates the motor as shown by speed curve S in FIG. 3.

As the motor operates and the speed increases, a feedback voltage proportional to speed is fed back from the motor circuit to junction 80 near the lower portion of FIG. 2b. This feedback voltage which is of positive polarity appears across junction 80 and common conductor 36 as a voltage feedback signal. This voltage signal causes current flow from junction 80 through resistors R32 and R31 to common conductor 36 to regulate the motor torque. Thus, as the motor accelerates to running speed, this feedback reduces the motor torque as shown in FIG. 3 to 50 percent torque which is assumed to be necessary for the particular load. The motor torque is the average of the increase and decrease zig-zags which are actually of higher frequency but are shown exaggerated in FIG. 3 for illustrative purposes.

Positive polarity feedback voltage is also applied from junction 80 through resistor R33 to summing point 86 at the base of transistor T4 to maintain this transistor turned on.

Each time that increase SCR2 is fired, hoist SCR1 being on, current flows from positive conductor 12 through SCR1, inductor 40, upper half of inductor 42, junction 43, contact M1, coil of relay SBR, armature A, contact 4, resistor SR, inductor SI, junction 49, lower half of inductor 48, inductor 50, and increase SCR2 to common conductor 14. This increases the motor torque and is shown as the positive zig in curve T in FIG. 3.

Each time that decrease SCR3 is fired, capacitor C4, which has been charged by current flow through increase SCR2, discharges in the loop including SCR3, inductor 46 and the upper half of inductor 48. This current induces a voltage in the lower half of inductor 48 to turn SCR2 off. For a description of the function of protective inductors 40, 44, 46 and 50, reference may be had to R. L. Risberg copending application Ser. No. 733,507, filed May 31, 1968. With increase SCR2 turned off, current now continues to flow down through hoist SCR1 and to the right in the armature, series resistor and series inductor but must flow up through diode D5 to conductor 12. The motor current that is proportional to the torque decreases as shown by the negative zag in curve T in FIG. 3.

The energy stored in inductor 48 by discharge of capacitor C4 now decays by current flow through double-duty resistor R4 and diode D5. This decaying of the induced current is one function of resistor R4. It will be noted that the motor currents hereinbefore described do not flow through resistors R3 and R4 but that these resistors are in series with the respective pairs of SCR's across the power source. Motor current flows through R3 in lowering direction only—this motoring current is only present in 3rd quadrant operation, and therefore has little effect on the size of R3. That is, resistor R3 is in series with SCR1 and SCR4 across the constant potential bus, power conductors 12 and 14. Also, resistor R4 is in series with SCR2 and SCR3 across conductors 12 and 14. In this manner, these resistors serve another duty, namely, protecting the associated SCR's from induced voltage peaks or protecting one SCR from the full bus voltage in the event the other SCR in series therewith fails. Increase and decrease are fired alternately as shown by curve T in FIG. 3 between $t_0$ and $t_2$.

The midportions of the curves in FIG. 3 illustrate the function of the motor when it is decreased to quarter speed. This is done by turning the speed setter part way back. This reduces the voltage at the base of transistor T3 and in turn reduces the output from transistor T5. Thus, the signal at the base of transistor T9 may be reduced to pedestal level, that is, the level provided by the voltage divider formed by resistors R51 and R52. This is the positive voltage level below which the current reference signal cannot go and limits the negative torque to 75 percent.

The signal that is now applied to input junction 98 of the level detector is the positive pedestal voltage minus the positive polarity current feedback signal. Decrease will now be gated continuously until the armature current decreases to zero and reverses, and consequently the current feedback signal reverses and when added to the pedestal voltage, drives the input at the level detector above positive 5 volts, which causes increase to be fired again as shown by the first positive slope of curve T following time $t_2$ in FIG. 3. When increase SCR2 is fired, decreases SCR3 is turned off. However, the motor current continues to flow in the left-hand direction in the armature. Series inductor SI now becomes a source of voltage which adds to the armature counter voltage so that the sum exceeds the bus voltage. This causes SCR5 and SCR6 to be fired. However, only SCR6 is effective since SCR5 merely shunts increase SCR2 which is conducting.

The manner of firing these resistor loop SCR's will be described in connection with firing circuit FC5 since firing circuit FC6 is similar except for the setting of potentiometer 76 and is shown in block form.

When the bus voltage is exceeded as aforesaid, the voltage at the slider of potentiometer 74 exceeds the breakover voltage of Zener diode ZD1. As a result, current flows from conductor 12 through resistor R18, potentiometer 74 and its slider, Zener diode ZD1 and the base and emitter of transistor T1 to common conductor 14. This turns the transistor on, causing current flow from supply conductor 72 through resistors R14 and R15 and transistor T1 to conductor 14. The voltage drop across resistor R14 causes current flow from conductor 72 through resistor R16 and the emitter-base circuit of transistor T2 to turn the latter on. As a result, current flows from conductor 72 through resistor R16, transistor T2 and R17 into the gate of SCR5 to fire this SCR5 into conduction. This closes the resistor loop through resistor R10, inductor 66 and SCR5 but without effect at this time since it merely parallels the increase SCR2 circuit.

As the aforementioned sum voltage rises higher, the voltage at the slider of potentiometer 76 operates firing circuit FC6 to fire SCR6 into conduction. As a result, the motor current now continues to flow in the same direction but instead of flowing through the decrease SCR3, it flows in the resistor loop path and up through the diode shunting increase SCR2. This path extends from the left side of the armature through relay SBR coil, contact M1, resistor R3, diode D3, supply conductor 12, resistor R11, inductors 68 and 70, SCR6, common conductor 14, diode D4, resistor R4, inductor SI, resistor SR and contact 4 to the right side of the armature.

In this circuit the negative motor current becomes less as shown by the positive slope in FIG. 3. The voltage at the level detector then falls below 4 volts and decrease is fired again, followed by increase, etc. Each time increase is fired, SCR6 closes the resistor loop to provide a path for the negative diminishing current when the bus voltage tries to rise. Each time decrease is fired, SCR5 and SCR6 are turned off. For this purpose, when decrease SCR3 is fired, commutating capacitor C4 discharges through SCR3, inductor 46 and the upper half of inductor 48. As indicated by the broken lines, the upper half of inductor 48 is not only magnetically coupled to its lower half by which SCR2 is turned off, but is also magnetically coupled to inductor 68. This induces a voltage in inductor 68 to reverse bias SCR6 off. The voltage polarities are indicated by the dots adjacent the inductor windings. The upper half of inductor 48 reverse biases SCR5 to turn it off.

The motor current then varies as indicated by curve T between time $t_2$ and time $t_3$ in FIG. 3 to decelerate the motor to quarter speed. The negative torque is limited to 75 percent because just beyond this value of negative torque the sum of the pedestal voltage and the feedback current signal exceeds 5 volts causing increase to be fired. As this lower speed is reached, the system automatically regulates to 50 percent positive torque by feedback control as hereinbefore described to maintain the motor running at quarter speed.

When the speed setter is turned back to the off position at time $t_4$ in FIG. 3, 75 percent negative torque is again applied as hereinbefore described to decelerate the motor to a stop.

It will be seen in FIG. 2a that when the speed setter is turned back to off position from hoist, the relays and main contactor restore except for undervoltage relay HUV which is self-maintained energized, contactor DB which is maintained energized by relay HUV, and relay TC which is maintained energized by contactor DB. Contact 4 of the speed setter opens the energizing circuit of relay BR to deenergize this relay. Relay BR reopens its contact BR1 in FIG. 2b to deenergize brake solenoids S thereby to engage the mechanical brake. Relay BR at contact 2 opens its self-maintaining circuit and at contact 3 deenergizes relay MTR. After a time interval assuring complete stopping of the motor, relay MTR opens timed opening contact 1 to deenergize relay MR. This relay reopens its contact MR2 in FIG. 2c to disconnect the supply voltage from the transistors of firing circuits FC5 and FC6. This prevents inadvertent firing of the resistor loops SCR5 or SCR6 by transients since they would stay on due to the D.C. supply voltage. Relay MR also reopens its contact 1 in FIG. 2a to deenergize contactor M which reopens contacts M1, M2 and M3 to disconnect the armature, disconnect the voltage feedback and deenergize relay FTR, respectively. Relay SBR also deenergizes when the motor current decreases. After a time interval, relay FTR reopens its timed opening contact 1 to deenergize relay FP. This relay reopens its contact FP1 to insert resistor R5 in the shunt field winding so that the field will next time again be energized in steps at reduced value and then at full value.

The system is now stopped and ready for further operation by turning the speed setter.

Figure 4:
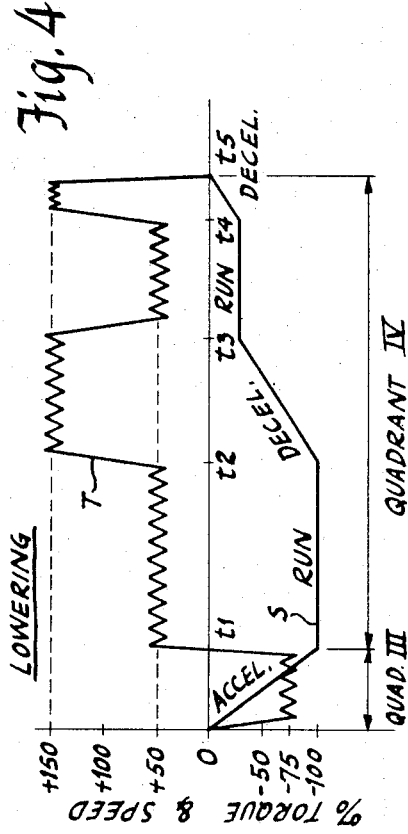

FIG. 4 shows the torque and speed curves for lowering operation. This includes acceleration in the lowering direction with 75 percent negative torque which is Quadrant III operation, and running in the lowering direction under load and deceleration, both with positive torque, which is Quadrant IV operation.

This operation is started by turning the speed setter in the lower direction. This causes energization of relays FP, MR, FTR and contact M as before. In addition, contact 5 of the speed setter energizes relay LBR to close its contact LBR1 in FIG. 2b without effect at this time since contact 2 of the limit stop switch thereacross is closed. Contact 6 of the speed setter energizes limit relay L which opens its contact L1 and closes its contact L2 in FIG. 2b.

This operation of the limit relay contacts disconnects positive 22 volts from the base of transistor T4 and connects minus 22 volts thereto. Thie negative voltage at the base biases transistor T4 off.

As a result, positive voltage is applied through resistors R35 and R36 to the base of transistor T6 to turn it on. This shunts the hoist firing circuit oscillator to prevent it from firing hoist SCR1.

At the same time, the positive voltage at the collector of transistor T4 unshunts the lower firing circuit oscillator to allow it to run and to gate lower SCR4.

The aforesaid turning of the speed setter in the lower direction causes a negative voltage to be applied from the slider of hoist-lower potentiometer HLP in FIG. 2a to the base of transistor T3 to turn it off since its emitter is tied through resistor R31 to zero voltage conductor 36.

As a result, transistor T5 is also turned off so that no voltage error signal is applied therefrom. Consequently, the current reference signal is at the pedestal level provided by divider R51–R52. Since no current feedback is present, this pedestal level which may be 2 volts is applied to the level detector in FIG. 2c to cause firing of decrease SCR3.

Since the decrease and lower SCR's are now fired, current flows from conductor 12 through decrease SCR3, inductor 46, upper half of inductor 48, resistor R4, inductor SI, resistor SR, contact 4, armature A, coil of relay SBR, contact M1, resistor R3, lower half of inductor 42, inductor 44 and lower SCR4 to common conductor 14. The current feedback signal increases the input to the level detector to 5 volts. Increase is fired until the input to the level detector is reduced to 4 volts, etc. The average value of the current feedback signal is 2.5 volts. Relay SBR closes contact SBR1 to energize brake relay BR to release the mechanical brake and to energize relay MTR.

This causes application of 75 percent negative torque to accelerate the motor in the lowering direction as shown at the left portion of the curves in FIG. 4 indicated as Quadrant III operation. Each time the negative torque current increases, the current feedback also increases and is added to the pedestal voltage. Eventually the sum thereof will exceed 5 volts at the level detector junction 98 to cause firing of increase SCR2. This causes decrease SCR3 to be turned off. The motor current continues to flow in the same direction through lower SCR4 and diode D4. This is shown by the first positive slope in curve T in FIG. 4. The motor current then diminishes and when the level detector voltage drops below 4 volts, decrease SCR3 is again fired, followed by increase SCR2, etc., alternately. When the motor nears running speed, the speed feedback voltage at junction 80 in FIG. 2b regulates the system to 50 percent positive torque at time $t_1$ in FIG. 4.

As the motor accelerates in the lowering direction, a negative voltage is fed back and applied to junction 80. This negative voltage regulates the current reference signal to which is added the current feedback signal to provide a sum which causes increase SCR2 to be fired continuously until the motor current diminishes and reverses direction to flow down through increase SCR2 and up through diode D2. This current produces retarding torque to maintain the motor at running speed in the lowering direction as indicated by curve T between times $t_1$ and $t_2$ in FIG. 4. This reversed current now reduces the voltage at the level detector to fire decrease SCR3 followed by firing increase, etc., alternately, to maintain the lowering speed constant as indicated by curve S up to time $t_2$ in FIG. 4.

To decelerate the lowering load, the speed setter is turned back some distance to the quarter speed point, for example. This decreases the negative speed reference voltage at the base of transistor T3 and consequently increases the current reference signal in view of the negative speed feedback voltage at the emitter. Increase is fired continuously until 150 percent retarding torque is obtained. At this value, decrease SCR3 is fired and increase SCSR2 is turned off. As a result, the series inductor becomes a voltage source to raise the bus voltage to fire SCR5 in the first resistor loop. Current now flows down through this resistor loop and up through diode D2 to provide up to 75 percent retarding torque. If the bus voltage continues to rise due to the overhauling load, SCR6 is fired to close the second resistor loop. Current now also flows up through diode D5 and down through the second resistor loop in parallel with the first resistor loop to provide up to 150 percent retarding torque as shown by the curves between times $t_2$ and $t_3$ in FIG. 4.

The system then regulates to 50 percent positive torque at quarter lowering speed up to time $t_4$. And when the speed setter is turned off, 150 percent retarding torque is again applied to bring the motor to stop at time $t_5$ in FIG. 4.

It will be apparent that the relocation of resistors R3 and R4 produces advantages without adding material. Formerly, this type of resistors were connected in the horizontal line between the center point of the half-bridge and the center point between the parallel commutating capacitor and diode circuits. In this position, these resistors served only one function, that of decaying the induced current of the commutating inductors. In the new location as shown herein, these resistors still serve this purpose and additionally protect the SCR's since they are now also in series with the SCR's across the constant potential supply bus. The peak blocking voltage on the SCR that is off is also reduced.

The anti-plugging function of the solid state circuit will now be described.

Let it be assumed that the system is lowering and the speed setter is turned all the way past the off position to a hoist position. What the anti-plugging circuit does is to prevent firing of hoist SCSR1 until the motor has come almost to zero speed. As is well known, anti-plugging saves the use of protective resistors in the motor circuit. Thus, if reverse voltage were applied while the motor is still running fast, the reverse voltage is added to the counter voltage to raise the voltage excessively high requiring insertion of resistors in the motor circuit for protective purposes.

Since in this system, regenerative braking type of retarding torque is used for both deceleration and stopping, plugging is not required and anti-plugging, if includable in the solid state control system, avoids the requirement of such protective resistors. Consequently, incorporation of anti-plugging control in the solid state system is highly desirable.

It will be recalled that during hoisting a positive voltage is fed back to summing junction 86 at the base of transistor T4. Also, during hoisting, positive voltage is applied through contact L1 to this base to keep transistor T4 turned on.

On the other hand, during lowering, negative voltage is applied through contact L2 to summing junction 86 to keep transistor T4 turned off. Also, negative feedback voltage is applied from the motor to junction 86.

Now, it will be apparent that during lowering with negative voltage through contact L2 and negative feedback at junction 86, turning potentiometer HLP to hoist will not allow firing of hoist SCR1 so long as the motor continues to rortate in the lowering direction and keeps its negative voltage at junction 86. This is so even if contact L2 opens and contact L1 closes to connect positive voltage to the summing junction. This supply voltage is 22 volts whereas the feedback voltage overpowers it as junction 86 to keep transistor T4 turned off.

Figure 5:
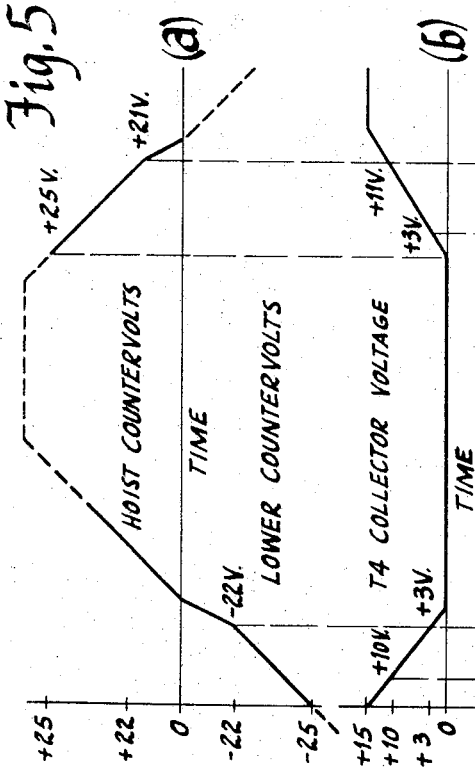
FIG. 5 graphically depicts directional control characteristics of the SCR firing circuit.
Figure 5:
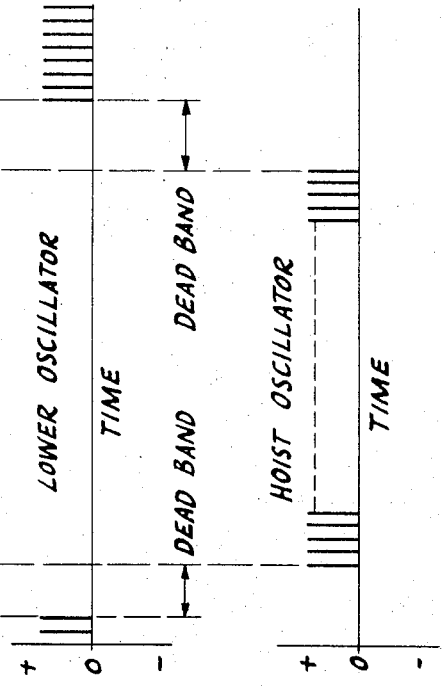

FIG. 5 shows how the reversal of voltage on the motor is allowed to take place by the anti-plugging control as the motor slows down under retarding torque hereinbefore described. The lower oscillator is running as shown at FIG. 5(c). As the motor speed approaches zero and the counter voltage decreases to minus 25 volts, FIG. 5(a), transistor T4 starts turning on so that its collector voltage starts decreasing from about 15 volts positive as shown in curve (b). At about 10 volts at the collector, transistor T4 conducts enough current in shunt to stop the lower firing circuit oscillator from running as shown at (c) in FIG. 5.

There now is provided a dead band during which neither lower SCR4 nor hoist SCR1 is gated. This insures that both will not conduct at the same time.

When the counter voltage has reduced to minus 22 volts, transistor T4 has turned on some more so that its collector voltage has dropped to plus 3 volts. At this voltage, transistor T6 turns off enough to allow the hoist firing circuit oscillator to start running as shown at FIG. 5(d). The value of resistor R38 determines the width of this dead band since its value determines at what transistor T4 collector voltage transistor T6 will operate effectively to control the hoist oscillator.

The right-hand portion of the curves in FIG. 5 show the anti-plugging control when changing from hoist to lower. As shown by curve (b), the T4 collector voltage now increases as it is turned off by the sum of the positive counter voltage and the negative supply voltage at summing junction 86. At 3 volts at the collector, the hoist oscillator turns off to start the dead band. At about 11 volts at T4 collector (plus 21 counter volts), the lower oscillator starts. These values are exemplary and may be adjusted for any particular system. A one volt threshold is shown between turn off and turn on of the lower oscillator controls. This value may vary but is included for exemplary purposes.

The limit stop and backout operation will now be described.

To prevent damage, a protective limit stop switch LS is arranged to stop the hoist quickly in the event a load is hoisted too far. In such event, contacts 1 and 3 close and contacts 2 and 4 of limit stop switch LS open in FIG. 2b. Contact 4 disconnects the armature from the supply. Contact 3 completes a dynamic braking circuit by connecting dynamic braking resistor DBR across the armature. The counter voltage causes current to flow from the left side of the armature through resistor DBR and contact 3 to the right side of the armature which provides a rapid dynamic braking stop.

In addition, contact 2 deenergizes solenoids S to cause application of the mechanical friction brake to aid in stopping the motor.

When contact 4 opens the armature circuit, the energy stored in series inductor SI is dissipated by current flow through resistors SR and R9, diode 8, decrease SCR3, inductor 46, the upper half of inductor 48 and resistor R4 for voltage of one polarity, and for voltage of the opposite polarity current will flow through the lower half of inductor 48, inductor 50, increase SCR2, resistor R8, diode D7 and resistor SR. Hence there is substantially no arcing on contact 4 when it opens the motor circuit.

Contact 1 of the limit stop switch closes a circuit affording backout of the load at substantially 50 percent torque to drive the hook down while no load lowering speed is limited to about 20 percent base speed or 50 percent at full load.

This is done by turning the speed setter in the lower direction. This causes firing of lower SCR4 as hereinbefore described since transistor T4 is biased off by contact L2 of relay L. Relay LBR closes its contact LBR1 in FIG. 2b to energize brake release solenoids S to disengage the mechanical brake. Contact LBR1 bypasses contact 2 of the limit stop switch that is now open. The motor is now energizing in the lowering direction in a circuit from positive supply conductor 12 through contact 1 of the limit stop switch, resistor R7, and then through contact 3 and armature A in parallel with resistor DBR, coil of relay SBR, contact M1, resistor R3, lower half of inductor 42, inductor 44 and lower SCR4 to common conductor 14.

This causes the motor to lower the load so that limit stop switch LS contacts restore to the positions shown in FIG. 2b. The speed setter may then be turned to off or to hoist or lower to operate the system as before.

It will be apparent that the circuit just described provides a simple and effective limit stop and backout control operable from a constant potential bus.

The field supply on power failure circuit will now be described.

Diode D6 and its connection automatically provide shunt field energization to afford dynamic braking of the motor in the event of power failure. This is a necessary safety measure which prevents the dangerous condition of the load falling if simultaneous failure of mechanical braking and power loss should occur.

If the power fails, dynamic braking relay DB restores to reclose its contact DB1 in FIG. 2c. When the load starts lowering under overhauling load, a dynamic braking circuit extending from the right side of the armature through contacts 4 and DB1 and dynamic braking resistor DBR to the left side of the armature becomes effective dynamically to brake the motor. To make this possible, the armature supplies current from the right side thereof through contacts 4 and DB1, diode D6, resistor R5 and the shunt field winding to the left side of the armature. Thus, the shunt field is energized and the dynamic braking allows the load to lower slowly.

While the system hereinbefore described is effectively adapted to fulfill the objects stated, it is to be understood that the invention is not intended to be limited to the paricular preferred embodiment of static shunt motor crane hoist control system disclosed, inasmuch as it is susceptible of various modifications without unduly departing from the scope of the appended claims.

We claim:

1. A static load control system comprising:
an electric power supply source;
static reversing chopper means including two pairs of static switching devices supplied from said source for applying either forward or reverse voltage to the load to energize it in either selected direction and including commutating means operable when one static switching device of a pair thereof is turned on for providing commutating energy to turn the other static switching device of such pair off;
means providing direction control signals;
static direction control means responsive to said direction control signals for controlling said static reversing chopper means to apply voltage to the load in the indicated direction; and
means in said static reversing chopper means serving the dual purpose of protecting the static switching devices therein from excessive voltage and decaying the commutating energy after it has performed its function.

2. The invention defined in claim 1, wherein said dual purpose means comprises:
a resistor connected in series with each pair of static switching devices, across the supply source and being also connected in a loop circuit with each static switching device and a portion of its associated commutating means.

3. A static chopper system comprising:
a constant voltage supply bus;
a static chopper circuit supplied from said bus for controlling the power to a load device;
said static chopper circuit comprising at least one pair of gating type semiconductor switching devices and control means therefor for applying a saw-tooth wave of current to the load device and commutating means responsive to turning one of said switching devices on for turning the other switching device off;

said commutating means comprising means for causing the commutating energy to decay after it has performed its function; and means for connecting the last mentioned means to perform not only said decaying function but also to function as a protective means for said switching devices to protect them from excessive voltage.

4. The invention defined in claim 3, wherein said last mentioned means comprises:

a resistor connected in series with said semiconductor switching devices across the supply bus.

5. The invention defined in claim 3, wherein said last mentioned means comprises:

a resistor connected in a loop circuit with each said semiconductor switching device and its associated commutating means and a portion of also connected in series with said semiconductor switching devices across the supply bus.

6. A static reversing chopper system comprising:

a constant voltage supply bus;

a static reversing chopper circuit supplied from said bus and comprising a directional control pair of forward and reverse control gating type semiconductor switching devices and an increase and decrease control pair of gating type semiconductor switching devices and control means therefor for applying a sawtooth wave of current to the load device;

said chopper circuit further comprising at least one commutating capacitor and at least one commutating inductor for each said switching device with the commutating inductors of each said pair of switching devices being magnetically coupled;

a loop circuit for each said commutating inductor including a unidirectional conducting device and the associated switching device; and a resistor for each said pair of switching devices, said resistor being connected in each of the associated loop circuits for decaying the commutating energy induced in the associated inductors, and said resistor being also connected in series with the associated pair of switching devices across the supply bus to protect them from excessive voltages.

7. The invention defined in claim 6, wherein said series circuit across the supply bus includes the pair of switching devices, the associated pair of commutating inductors and the associated resistor.

8. The invention defined in claim 6, wherein:

each said commutating capacitor is connected across a switching device and the associated commutating inductor.

9. The invention defined in claim 6, wherein:

the load device is connected in series with said forward and increase switching devices exclusive of said resistors so that the load current does not flow through said resistors.

10. The invention defined in claim 6, wherein:

the load is connected in series with said reverse and decrease switching devices and both of said resistors.

References Cited

UNITED STATES PATENTS

| | | | |
|---|---|---|---|
| 3,302,089 | 1/1967 | Rosa et al. | 318—257 |
| 3,406,325 | 10/1968 | Rosa | 321—45c |
| 3,428,880 | 2/1969 | Muller | 318—293 |
| 3,340,457 | 9/1967 | Schmitz | 321—45c |
| 3,355,654 | 11/1967 | Risberg | 321—45c |
| 3,378,740 | 4/1968 | Cruel | 318—380 |

ORIS L. RADER, Primary Examiner

K. L. CROSSON, Assistant Examiner

U.S. Cl. X.R.

318—293, 302, 380

PO-1050 (5/69)

UNITED STATES PATENT OFFICE
CERTIFICATE OF CORRECTION

Patent No. 3,555,384      Dated January 12, 1971

Inventor(s) John A. Halvorson    Robert L. Risberg
            Max S. Knasinski    Richard P. Serbiak It is certified that error appears in the above-identified patent and that said Letters Patent are hereby corrected as shown below:

Column 3, line 50, "fo" should be --of--.

Column 9, line 18, after "lower" insert --firing--.

Column 10, line 31, after "motor" insert --current--.

Column 11, line 57, "SCR" should be --SCR8--.

Column 13, line 65, "applid" should be --applied--.

Column 15, line 35, "decreases" should be --decrease--.

Column 18, line 40, "SCSR1" should be --SCR1--;

line 68, "rortate" should be --rotate--;

line 72, "as" should be --at--;

Column 19, line 73, "energizing" should be --energized--.

Column 21, claim 5, line 15, after "and" insert --a portio line 16, after "and" cancel --a portio Signed and sealed this 20th day of July 1971.

(SEAL)
Attest:

EDWARD M. FLETCHER, JR.      WILLIAM E. SCHUYLER,
Attesting Officer              Commissioner of Patent